Figure 1:
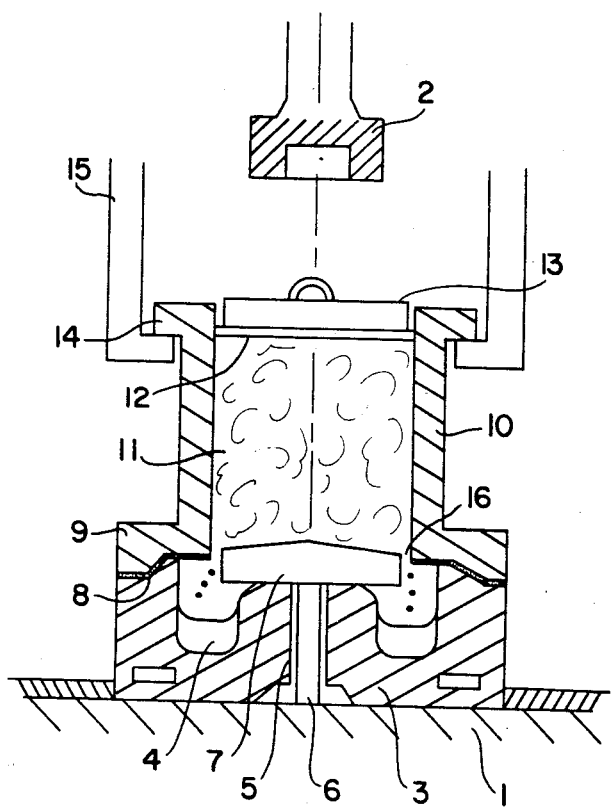

United States Patent [19]

Julliard et al.

[11] Patent Number: 4,575,056
[45] Date of Patent: Mar. 11, 1986

[54] APPARATUS FOR THE RECOVERY OF LIQUID ALUMINIUM BY COMPRESSION OF HOT DROSS

[75] Inventors: Jacques Julliard, Voiron; Louis Tirilly, Colmar; Pierre Vigier, Grenoble, all of France

[73] Assignee: Cegedur Societe de Transformation de l'Aluminium Pechiney, Paris, France

[21] Appl. No.: 742,787

[22] Filed: Jun. 10, 1985

Related U.S. Application Data

[62] Division of Ser. No. 683,270, filed as PCT FR 84/00070 Mar. 20, 1984, published WO 84/03719 on Sep. 27, 1984, § 102(e) date Nov. 21, 1984 Pat. No. 4,575,392.

[30] Foreign Application Priority Data

Mar. 22, 1983 [FR] France .............. 83 05080
Feb. 21, 1984 [FR] France .............. 84 02790
Mar. 20, 1984 [WO] PCT Int'l Appl. ... PCT/FR84/00070

[51] Int. Cl.[4] .......................... B30B 9/06
[52] U.S. Cl. ...................... 266/227; 100/116
[58] Field of Search .................. 266/227; 100/116

[56] References Cited

U.S. PATENT DOCUMENTS

| 2,278,135 | 3/1942 | Osborn | 75/24 |
| 4,057,232 | 11/1977 | Ross et al. | 75/24 |
| 4,137,073 | 1/1979 | Singleton | 75/68 R |
| 4,386,956 | 6/1983 | Roth et al. | 266/227 |

FOREIGN PATENT DOCUMENTS 8201895 6/1982 European Pat. Off. .
2312235 9/1973 Fed. Rep. of Germany .
2439621 5/1980 France .
49241 3/1955 Poland .

Primary Examiner—Melvyn J. Andrews
Attorney, Agent, or Firm—Dennison, Meserole, Pollack & Scheiner

[57] ABSTRACT

The present invention relates to a process and apparatus for the recovery of liquid aluminium by compression of hot dross.

The process comprises placing the dross in a die up to a height which depends on the diameter of said die and which is lower at the center than at the periphery of the die, and then applying to the dross a punch which is moved downwardly at a speed which is lower in proportion to a lower level of concentration of liquid aluminium in the dross.

The apparatus comprises a cylindrical die (10) provided with an insert member at each of its ends. The die rests on a base (3) which has an annular groove (4) on its upper face; the lower insert member (7) is of a diameter that is at least equal to the inside diameter of the groove and in any case less than the outside diameter and has a continuous upper face of conical shape; the space (16) between the wall surface of said insert member and the internal wall surface of the die is of a constant width and is disposed facing the groove.

The invention is used in the aluminium industry when there is a need to treat dross in an economical fashion and under good conditions in regard to health.

11 Claims, 1 Drawing Figure

APPARATUS FOR THE RECOVERY OF LIQUID ALUMINIUM BY COMPRESSION OF HOT DROSS

This is a divisional of co-pending application Ser. No. 683,270 filed on Nov. 21, 1984.

The present invention relates to a process and an apparatus for the recovery of liquid aluminium by the compression of hot dross. It should be noted that the term aluminium used in the specification of this application also embraces all the alloys of that element.

The cycle of production of aluminium from its ores or recycled waste material generally comprises a phase involving melting of the metal followed by a casting phase. The man skilled in the art is aware that, in the melting phase, formed at the surface of the metal bath in furnaces is a layer of a substance which is referred to as 'dross', analysis of which shows that the dross comprises non-metallic particles such as oxides, carbides, nitrides, etc, between which droplets of metal are trapped. If the contents of the furnace are poured as they are, the dross will be entrained therewith and will form inclusions in the solidified product; in subsequent transformation operations, for example rolling, such inclusions will give rise to the occurrence, if not of internal or surface defects, at least local areas in which the properties of the material suffer from heterogeneity, which is detrimental to high-quality products.

It is therefore found to be necessary for the dross to be removed from the metal before the casting operation, and that is generally done by skimming the bath by means of a scraper in the course of an operation which is referred to as the dross removal operation. However, the dross may contain a substantial proportion of metal, up to 95% of the mass of dross, and discharging such dross as it stands would result in a serious reduction in the level of efficiency of making use of the metal produced.

It is for that reason that the man skilled in the art turned to seeking ways of recovering the maximum possible amount of metal contained in such dross. One solution comprises treating the dross in the melting furnace itself by means of a flux, the effect of which is to cause the metal droplets to coalesce and to facilitate transfer thereof from the dross to the metal bath. However, apart from the harmful influence of the flux materials on the properties of certain alloys, the efficiency thereof in regard to the level of recovery remains limited so that, irrespective of the possible forms of treatment in the furnace, it is inevitably necessary to treat or re-treat the dross in special pieces of equipment after the dross has issued from the furnace.

Thus, it is known to use a working apparatus in which the dross is agitated in the presence of air and possibly flux so as to cause oxidation of a part of the metal that it contains. The highly exothermic oxidation reaction makes it possible for the dross to be maintained at a sufficient temperature for the metal droplets to be able to coalesce and to flow downwardly in the vessel where they are easily separated from the dross.

The hot dross which is drained off then goes into a hammering apparatus and is then separated in accordance with its granulometry so that a fresh portion of the metal which had escaped separation in the working apparatus is then extracted.

That type of treatment suffers from the disadvantage that, in order to ensure oxidation, it requires a loss of aluminium which is generally higher than 10% of the amount of aluminium contained in the dross. In addition, recovery of the material after the hammering phase is incomplete and more than 5% of the aluminium remains in the dross which is then discharged.

Besides the questions relating to the metal yield, that type of treatment is carried out under conditions which are often unsatisfactory from the point of view of health, by virtue of the fumes which may be emitted in the oxidation phase and the operations involving handling hot dross between the various pieces of apparatus for treating same, without mentioning the problems of noise and water pollution raised by discharging substances containing relatively soluble flux materials which emit harmful ions.

It is for that reason that this art has seen the appearance of other processes which avoid in particular the oxidation stage and which comprise rapidly cooling the dross, possibly under a flux, in rotary cylinders, and crushing the dross, and then sieving the dross to separate fractions having higher or lower proportions of aluminium therein.

However, in order to perform the cooling operation, it is then necessary to install very long cylinders, which gives rise to relatively high levels of capital investment costs and operating costs, and which nonetheless does not remove the harmful effects resulting from the emission of fumes and the loss of a not inconsiderable proportion of metal. In addition, such large installations require the treatment of large amounts of dross materials which necessarily come from different furnaces in which the qualities of alloys are not always the same. That results in the production of a liquid metal which varies in composition and which can be recycled only under certain conditions and after analysis thereof.

Other processes in which the hot dross is directly subjected to a mechanical treatment are known, such as centrifuging. However, the procedures involved have not generally gone beyond the laboratory stage by virtue of the inherent difficulties, upon extrapolation of such procedures, in blocking of the systems for discharging the liquid, by the dross.

It is for that reason that the applicants, having therefore found that the various solutions proposed were totally unsatisfactory in regard to overcoming the problem of recovering aluminium from dross, sought to develop a process which avoids the above-mentioned disadvantages, namely:
  the loss of aluminium due to oxidation and the limitations in regard to the recovery yield,
  recourse to expensive flux materials which give rise to pollution,
  the harmful effects caused by fumes and noise,
  the mixtures of drosses from different sources, and
  the use of installations which are expensive from the point of view of capital investment and operating costs.

For that purpose, the applicants directed their attention towards the compression of dross in a vertical unidirectional press. That procedure has certainly already been carried into effect. Thus, it is known for example from U.S. Pat. No. 2,278,135 for liquid tin to be recovered from dross formed by a solid antimony-aluminium intermetallic substance in a die with a diameter of 15 cm. Likewise, DE-OS No. 23 12 235 discloses a process and an apparatus for extracting liquid lead by heating at between 350° and 550° C. from dross in the form of compacted products with a diameter of 50 mm, weighing 500 g.

It may be noted that in both the above-indicated documents, on the one hand there is no information about the particular manner of using a press when it is to be employed to compress dross. Now, such dross comprise a semi-solid material, the behaviour is entirely different from powders or other solid materials which represent the major part of the materials which are generally subjected to such a treatment.

In addition, compression aims in particular to densify and modify the form of the compressed material, whereas this situation involves bringing together fine droplets of liquid which are dispersed in the mass of the dross, and expelling same from the mass of dross.

On the other hand, the above-mentioned documents take no account whatever of the difficulties inherent in extrapolation of the process on an industrial scale. Now, going from compression in a die which is 15 cm in diameter, or treating compressed items which weight 500 g, to compression of a tonne of product in a die which is of a diameter close to 1 meter, raises difficulties that the applicants have experienced.

It should be added that treating aluminium dross comprising a mass of metal having a melting point of 660° C. and oxides which are of low thermal conductivity and which can be melted in the vicinity of 2000° C. has nothing in common with the extraction of tin, which has a melting point of 232° C., or lead which has a melting point of 327° C., being dispersed in a dross of different properties.

It is for that reason that the present applicants realised the need to adapt the compression process when it is applied to the recovery on an industrial scale of the liquid aluminium which is contained in hot dross and when the major part of that metal is to be extracted.

The process according to the invention comprises loading the dross into a die of circular section, which is placed between the punch and the table of a vertical unidirectional press, and is characterised in that, the punch being applied to the upper part of the dross, it is moved downwardly at a maximum rate until a flow of liquid appears at the lower part of the die, and then at a rate which is lower in proportion to a lower level of concentration of liquid aluminium in the dross.

Thus, the applicants found that the punch of the press had to be moved in accordance with a particular set of operating conditions in regard to rate of movement in order to achieve a good level of efficiency in extraction of the metal.

The particular set of conditions in regard to the rate of movement of the punch comprises a rapid downward movement of the punch as long as the metal is only oozing or seeping out at the base of the mass of dross. Then, as soon as a continuous flow of liquid occurs, the rate of downward movement of the punch is reduced, until the flow ceases.

However, the applicants found that the rate of movement must be of a value which is dependent on the composition of the dross or rather the ratio in respect of mass between the liquid contained and the initial dross. Thus, the rate of downward movement of the punch must be set at a lower level in proportion to a lower level of concentration of liquid aluminium in the dross.

More precisely, it may be stated that the rate of movement corresponds to the following relationship:

$$V \text{ mm/min} = K \times (\text{mass of liquid})/(\text{mass of dross})$$

in which K is a constant, the value of which is between 150 and 300.

The above relationship seems to be explained by the fact that the increase in compactness of the mass of dross under the effect of the compression step must not be excessively rapid in order not to retard the droplets of liquid in coming together and flowing away. It is therefore necessary to try to achieve a constant flow rate of metal and attain the minimum volume of dross and therefore the maximum pressure only at the end of the compression step. In fact, the important consideration is more the rate of movement than the final pressure attained.

Therefore, the proportion of liquid in the dross is taken into consideration in determining the rates of movement to be applied. In some cases, a constant rate of movement is used, and it is simply sufficient to carry out an analysis of a mean sample of the dross to be treated, in order to determine the rate of movement; however, it is also possible for the operating conditions to be such that the rate of movement varies in the course of time, to take account of the variation in the concentration of liquid in the dross, in which case the law in respect of such variation is determined beforehand, on the basis of a model compression operation.

The applicants also found that the height of the dross which is put into the die is an important factor in regard to achieving a good extraction yield. Thus, the height H of the dross, as measured at the periphery of the die, must take account of the diameter D of the die, and that precisely the ratio D/H must be between 0.5 and 1.5.

The applicants also found that the height of the dross must not be the same over the entire section of the die but lower at the centre than at the periphery so that the mass of dross has a concave conical surface in its lower portion. The conical configuration participates, with the ratio D/H, in suitably distributing the pressures within the volume of dross and should preferably be such that the difference in height Δh of dross in mm between the periphery and the centre is between $$0.5 \left( \frac{D \text{ mm}}{100} \right)^2 \text{ and } 1.5 \left( \frac{D \text{ mm}}{100} \right)^2$$

It should be noted that, for values of D of less than 250 mm, Δh may be equal to 0, which shows that such a characteristic was not a factor of interest in regard to laboratory dies.

The present invention also concerns an apparatus for compression of dross, of industrial size.

This apparatus does not concern the unidirectional press itself but a particular apparatus which is intended to be temporarily placed between the punch and the table of the press, comprising a base of which rests a cylindrical die which is provided at each of its ends with a circular insert member spaced from the inside wall surface of the die, and characterised in that the base has on its upper face an annular groove whose bottom communicates with the exterior, that the lower insert member is separable from the base, is of a diameter at least equal to the internal diameter of the groove and in any case less than the outside diameter of the groove, and has a continuous upper face of conical form, and that the space between the wall surface of said insert member and the internal wall surface of the die is of a constant width and disposed facing the groove.

Thus, the apparatus according to the invention concerns a removable base-die assembly which can be placed on the table of a unidirectional press so as to be able to subject the dross contained in the die to the compression force applied by the punch when it is displaced vertically downwardly towards the table. Any conventional industrial press which produces a sufficient force may be used in the present invention, adapting the external shapes of the apparatus to the dimensions thereof, as required.

The apparatus therefore comprises on the one hand a removable base which is made of a cast steel resting by means of its base portion on the table of the press. The base is characterised by the provision on its upward face of an annular groove which extends into the body of the base to a greater or lesser depth, the width of the groove being generally greater than the space separating the internal wall surface of the die from the side wall surface of the lower insert member.

The bottom of the groove is inclined with respect to the horizontal and its low point communicates with the exterior so that it can be brought into communication with the upper part of a storage tank provided with suitable heating means.

The upward face of the base is also provided at its centre with a cavity of cylindrical shape, which extends virtually over the entire height thereof, and in which is housed a projection provided on the lower insert member. The insert member, being of a disc shape, rests horizontally on the base in a position in which it is guided by the projection, and can be easily separated from the base. The outside diameter of the insert member is at least equal to the inside diameter of the groove, that is to say, its outside wall surface may extend in line with the inside wall surface of the groove, but it may also be slightly larger so that its wall surface overhangs the groove. However, the diameter must be such that it leaves the major part of the groove open in an upward direction.

The lower insert member is also characterised in that it has a continuous upward face, that is to say, it does not have any perforation or other flow orifice; the upper face is not flat but projects outwardly, forming a cone having a half angle at its apex which is preferably between 75° and 85°.

The apparatus according to the invention also comprises a die, a kind of cylinder of cast steel, being of height and internal diameter which are substantially close together, with an overall diameter which is approximately identical to the diameter of the base.

At each of its upper and lower ends, the cylinder is provided with a respective collar. The upper collar serves as a means for fixing to a holding means for raising it or depositing it on the base; the lower collar forms the means for seating the die on the base and it is provided in its lower portion with engagement means which are filled to corresponding engagement means provided on the upward face of the base, outside the annular groove. The engagement means have contact surfaces which are inclined with respect to the vertical so as to ensure that one component cannot bind against the other and so as to make the two components easily separable, in spite of the thermal stresses to which they are subjected.

When the die rests on the base, the internal wall surface thereof is spaced from the wall surface of the lower insert member by a space which is of a constant width over its entire periphery, that space being above and in line with the groove. The width of the space is between 5 and 20 mm and is generally less than the width of the groove. The die is provided on its side wall with a heating system which permits its temperature to be raised to 200° C. at least above the melting point of aluminium, that is to say, to more than 860° C.

The side wall of the die is covered by a heat insulating means over the portion of its surface which is between the two collars.

Disposed at the top of the die is the upper insert member, being a sort of steel disc which is provided with a hook on its upper face and which is separated from the dross by a layer of thermal insulation and which can move freely within the die but with a very limited clearance.

The operating cycle of the apparatus according to the invention is as follows: the assembly comprising the base, the die and the storage tank is brought up by means of a fork lift truck, for example, into the vicinity of the furnace from which the dross is to be removed. The die, having been raised to a temperature in the region of 900° C., is then filled with dross and then closed by means of the layer of thermal insulation, to prevent any fumes from being emitted. The assembly is then moved to the table of the press and the upper insert member is lowered into the die. The punch of the press then moves downwardly in such a way that, by way of the upper insert member, the dross is subjected to a pressure such that the height thereof is progressively reduced to at least one quarter of the initial height. Under those conditions, the liquid aluminium is continuously displaced downwardly and flows away over the conical face of the upper insert member before escaping through the space between the wall surface of the upper insert member and the internal wall surface of the die, and falling into the annular groove where it follows the slope thereof to issue from the base and be collected in the storage tank. The width of the space between the die and the lower insert member was so designed as to permit the metal to escape from the die easily without however giving rise to blockages caused by particles of dross being entrained therewith.

The use of compression for recovering aluminium from dross has not been the subject of industrial application by virtue also of the difficulties which were involved in extracting the cake after the compression operation. However, the apparatus according to the invention makes it possible to overcome such difficulties. In fact, if, under the best operating conditions, the punch merely has to be held in a position of bearing against the cake, and the die simply has to be raised by means of hoist which is connected to the upper collar, to leave in place the cake and the two insert members on the base, thus constituting an assembly which can be easily separated into its components, in contrast, in most cases, that mode of operation is found to be impossible. It is necessary to be able to operate in a different manner. The fact that the lower insert member is separable from the base makes that possible. For that purpose, after the punch has been raised, the assembly comprising the die, the cake and the insert members is lifted so as to free the projection from the base. The die is then held in position by means of a support placed below the upper collar. The punch is then lowered and bears against the upper insert member which it expels from the die at the same time as the cake and the lower insert member. The cake can then be easily released from the two insert members.

Such an apparatus has many advantages over the prior-art apparatuses.

It makes it possible to recover the dross at the same location as the skimming operation took place, without the need for an intermediate storage capacity and without therefore carrying out transfer operations, which are a source of trouble.

As the dross is treated in batches, of relatively small quantities, of clearly identified origin, the metal recovered is of known composition and may therefore be directly recycled, without analysis.

No loss of aluminium due to oxidation is to be recorded and the extraction yield in the true sense is improved so that the overall recovery yield is higher than that of all the other apparatuses. The problems involved in using flux materials do not arise.

The installation used employs a press whose capital investment and operating costs remain relatively moderate.

The present invention will be better appreciated by reference to the accompanying single FIGURE which shows a view in vertical section of the apparatus as claimed.

Shown therein are the table of the press 1 and the punch 2 between which the base 3 is positioned. The base 3 has an annular groove 4, and a cavity 5 in which the projection 6 on a lower insert member 7 is engaged. The upper face of the insert member 7 is of a conical shape. The base is provided with locking or engagement means 8 on which the die 10 rests, by way of its lower collar 9. The die 10 is filled with dross 11 on which an insulating layer 12 and the upper insert member 13 are placed, the die being provided with an upper collar 14 which permits it to be moved upwardly by means of a lifting system 15. Reference numeral 16 denotes the space between the lower insert member and the internal wall surface of the die.

The invention may be illustrated by means of the following example of use thereof: a die with an inside diameter of 1050 mm and being 870 mm in height, heated at 810° C. and placed on a base having an annular groove which is 130 mm in width and 100 to 150 mm in depth, and a lower insert member with an outside diameter of 1030 mm, was filled with 850 kg of dross containing 50% of metal and disposed under the punch of a 600 tonnes press. The dross occupied a height of 800 mm at the periphery and 710 mm at the centre. The rate of downward movement of the punch was 75 mm/min and more than 95% of the aluminium contained was recovered. The final pressure was 8 MPa.

The present invention is used in the aluminium industry when there is a need to treat dross in an economical fashion and under good conditions in regard to health.

We claim:

1. Apparatus for the recovery of liquid aluminium by compression of hot dross and easy extraction of the cake of compressed dross, which is intended to be temporarily placed between the punch (2) and the table (1) of a unidirectional press, comprising a base (3) on which rests a cylindrical die (10) adapted to be filled with dross and provided at each of its ends with circular insert member (7 and 13), characterised in that, on its upper face, the base has an annular groove (4) whose bottom communicates with the exterior, that the lower insert member (7) is separable from the base, is of a diameter at least equal to the inside diameter of the groove and in any case less than the outside diameter of the groove, and has a continuous upper face which projects outwardly, forming a conical configuration, and that the space (16) between the side wall surface of said insert member and the internal side wall surface of said die is of a constant width which is disposed in a horizontal plane and facing the groove.

2. Apparatus according to claim 1 characterised in that the cone formed by the upper face of the lower insert member has a half-angle at its apex of between 75° and 85°.

3. Apparatus according to claim 1 characterised in that the space between the side wall surface of the lower insert member and the internal side wall surface of the die is of a width of between 5 and 20 mm.

4. Apparatus according to claim 1 characterised in that the width of the groove is greater than the space which separates the side wall surface of the lower insert member from the internal side wall surface of the die.

5. Apparatus according to claim 1 characterised in that the bottom of the annular section is inclined with respect to the horizontal.

6. Apparatus according to claim 1 characterised in that on its lower face, the lower insert member is provided with a projection (6) which is perpendicular to said face and which is of cylindrical shape which penetrates into a cavity (5) provided in the base.

7. Apparatus according to claim 1 characterised in that the die rests on the base by way of engagement means (8) having contact surfaces which are inclined with respect to the vertical.

8. Apparatus according to claim 1 characterised in that the die is provided with collars (9) and (14) in each of its upper and lower parts.

9. Apparatus according to claim 1 characterised in that the low point of the annular groove of the base opens towards the exterior into a heated storage tank.

10. Apparatus according to claim 1 characterised in that the outside side wall of the die is provided with a heating system and is heat-insulated.

11. Apparatus according to claim 1 characterised in that the upper insert member is separated from the dross by a layer (12).

* * * * *